P. H. THOMAS.
ALTERNATING AND DIRECT CURRENT ELECTRIC DISTRIBUTION.
APPLICATION FILED JUNE 13, 1910.
1,110,598.
Patented Sept. 15, 1914.
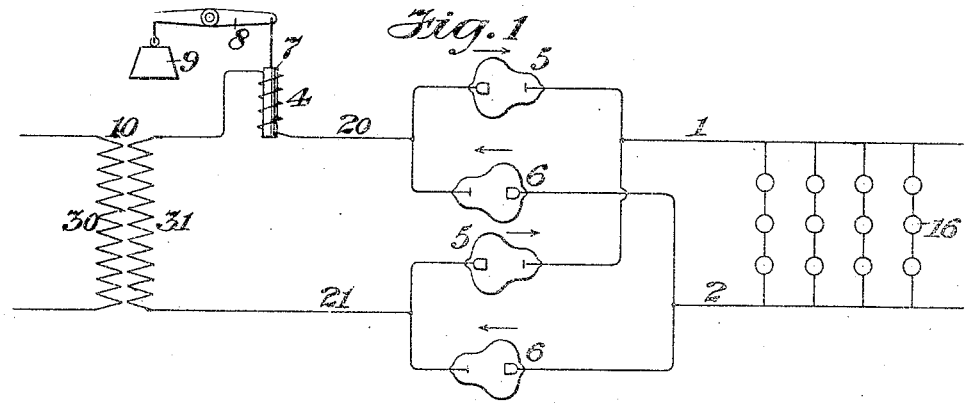
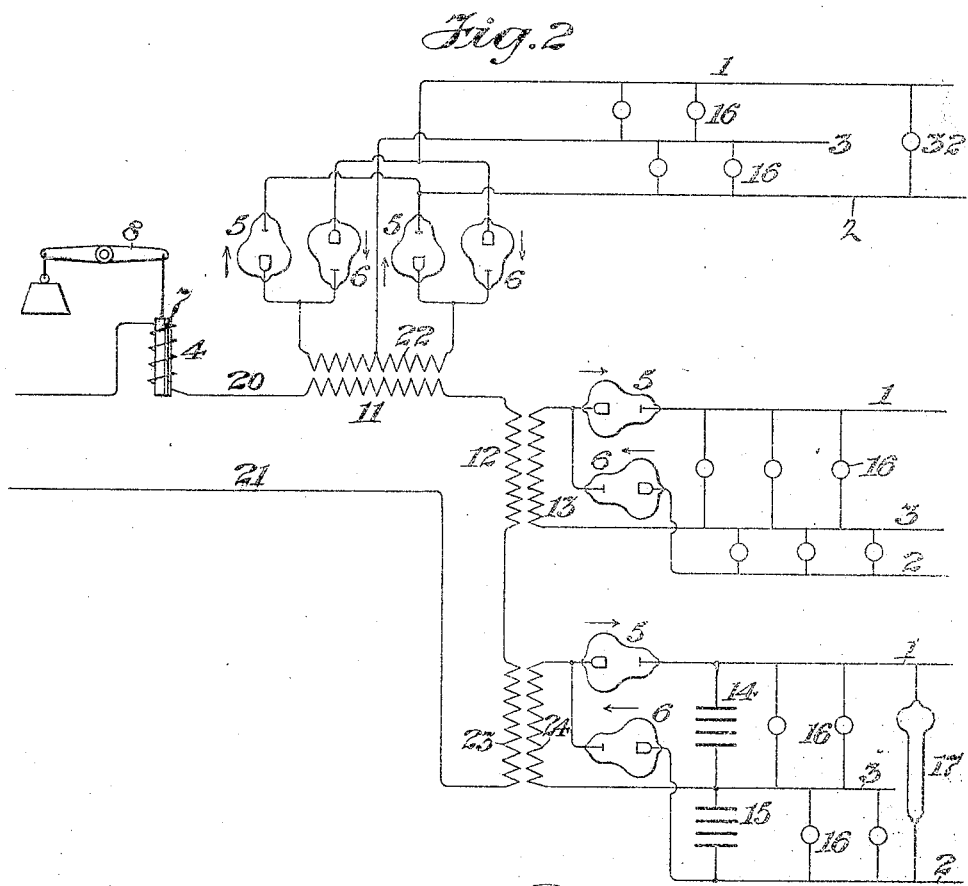
WITNESSES:
Chas. J. Clagett
Thos. H. Brown
INVENTOR
Percy H. Thomas
BY
George N. Stockbridge
his ATTORNEY

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ALTERNATING AND DIRECT CURRENT ELECTRIC DISTRIBUTION.

1,110,598.     Specification of Letters Patent.     Patented Sept. 15, 1914.

Original application filed January 24, 1903, Serial No. 140,353. Divided and application filed May 6, 1903, Serial No. 155,923. Divided and this application filed June 13, 1910. Serial No. 566,540.

*To all whom it may concern:*

Be it known that I, PERCY H. THOMAS, a citizen of the United States, and resident of Montclair, county of Essex, State of New Jersey, have invented certain new and useful Improvements in Alternating and Direct Current Electric Distribution, of which the following is a specification.

The present invention discloses a system of electric circuits and apparatus by means of which it is made possible to obtain direct currents of constant strength from a source of constant alternating currents, and to apply the current thus obtained to any type of translating devices requiring constant current.

The distribution of the currents derived from the source to the work or consumption circuit is controlled by means of current rectifiers. These may be devices of the same general character as the gas or vapor electric lamps disclosed in certain United States Letters Patent issued to Peter Cooper Hewitt, September 17, 1901, notably Patents No. 682,690 to 682,699, inclusive.

The apparatus referred to consists, in general, of a suitable container inclosing a conducting gas or vapor and two or more electrodes. The negative electrode may conveniently be of mercury, and the positive electrode or electrodes may be of iron.

It is known that when apparatus of this description is subjected to the proper conditions, current will traverse the gas or vapor within the container in a given direction, after the original resistance to starting has once been broken down, while it will oppose to the flow of current in the opposite direction a practically prohibitive resistance.

The manner in which I utilize the qualities of such a current rectifying device so as to serve the purposes of the present invention will be understood by reference to the accompanying drawings, the two figures of which are diagrammatic illustrations of typical systems of electrical distribution to which, among others, my invention is applicable.

Referring to Figure 1, 10 represents a transformer, the primary, 30, of which is connected with leads from a constant potential alternating source. Its secondary, 31, is connected with distribution wires, 20 and 21, in one of which, as 20, is included a reactance coil, 4. To complete the reactance device, a suitable core, 7, is provided and this core is connected to one end of a pivoted lever, 8, which supports at its opposite end a counter-weight, 9.

The reactance coil 4 and its associated devices are intended to act as an alternating current regulator having the property of maintaining constant current in the work circuit. The regulator here shown is simply typical of alternating current regulators of any sort having the described property.

Instead of employing a transformer and a regulator, as described, the wires 20 and 21 may be supplied with alternating currents of constant strength by any other means, as, for instance, by a constant current alternating generator. The illustration herein chosen is simply intended to show that my invention is clearly applicable to well-known existing systems of alternating current distribution in which regulators designed to maintain constant current are used.

The mains of the consumption circuit are shown at 1 and 2, while the translating devices supplied through the consumption circuit appear at 16. These translating devices may be any translating devices whatsoever adapted to be operated by currents of constant strength and uniform direction, such, for instance, as direct current arc lamps.

To secure the delivery through the mains 1 and 2 of currents of proper direction from the wires 20 and 21, I make use of current rectifiers, 5 and 6, which have the quality of permitting a flow of current in one direction and opposing prohibitive resistance to the flow of current in the opposite direction. The direction of current flow through these devices is indicated by arrows. For convenience, the rectifiers marked 5 may be termed positive devices, and the rectifiers marked 6 negative devices. It will be seen that the main conductor 1 is connected to each of the delivery wires 20 and 21, through a positive device, and the main conductor 2 is connected to each of the said wires through a negative device.

Assuming that the system is in operation, positive impulses from the wire 20 will enter the consumption circuit through the current rectifier 5, thus reaching the main conductor 1, and will pass through the circuit to the main conductor 2, reaching the wire 21 through one of the current rectifiers 6. Any tendency for these impulses to pass to the wire 21 through the lower current rectifier 5, as it appears in the drawing, would be resisted by the said rectifier, which permits current flow only in the direction indicated by the arrow. Similarly, positive impulses from the wire 21 will pass through the rectifier 5, and after reaching the main conductor 1 will traverse the consumption devices to the wire 2 and go back to the wire 20 through one of the current rectifiers 6.

Negative impulses from the wires 20 and 21, will flow between the said wires and the wire 2 in the first instance, traversing one or the other of the rectifiers 6, and the completion of the course of the current after traversing the consumption circuit will take place through one or the other of the rectifiers 5. In this way the consumption circuit is supplied with currents of uniform direction, and as the applied currents are of constant strength, the circuit is adapted, as stated, to the feeding of direct current devices requiring constant current.

In Fig. 2 I illustrate the mode in which my invention may be applied to other forms of circuits. Here, for example, the wires 20 and 21 are shown as including the primaries, 11, 12 and 23, of three transformers whose secondaries are connected with varying forms of electric circuits. Thus, the secondary, 22, for the primary 11 is connected with a three-wire system of electrical distribution having the usual mains 1 and 2, and a neutral wire 3 running to an intermediate point in the said secondary. As before, one of the main conductors is connected to each outer terminal of the source through a positive device, and the other main conductor is connected to each outer terminal through a negative device.

When the two sides of the three-wire circuit are evenly balanced, there will be no resultant current in the neutral wire, and the positive impulses from the source will pass across the entire system and will return through one or the other of the rectifiers 6. Negative impulses will similarly pass through the entire three-wire circuit under the conditions named.

I may insert between the mains 1 and 2, one or more translating devices, as 32, requiring for operating the entire potential of the circuit.

The secondary 13, corresponding to the primary 12, is adapted to supply, through the connections indicated, two circuits which are here shown as having a common wire 3. The positive impulses from one terminal of the secondary will feed the translating devices between the wires 1 and 3, while the negative impulses from the same terminal will feed the translating devices between the wires 2 and 3, these conditions being reversed, however, when the positive and negative impulses from the other terminal of the secondary are considered.

The secondary, 24, corresponding to the primary 23, is here represented as supplying two circuits similar to those last described, except that storage batteries, 14 and 15, are here represented as being interposed between the wires 1 and 3, and the wires 2 and 3, respectively. I also show a typical representation, 17, of a Cooper Hewitt lamp connected up between the wires 1 and 2. The function of the storage batteries is to produce a more constant flow of current in the respective circuits. They will receive current and be charged by the successive impulses, and during intervals of no current flow from the source, they will deliver current to their respective translating devices. Any suitable form of accumulator may be substituted for the storage batteries shown.

The translating devices 16 will usually be constant current translating devices, but this is not regarded as an essential feature, and in Fig. 2, auxiliary devices such as storage batteries, are shown which permit the employment in the circuit of other types of translating devices.

The transformer 10 of Fig. 1, may itself be regarded as a source of constant potential currents which are made of constant strength by the employment of the reactance device 4. The transformation to constant current may be applied to currents derived from any alternating source, whether a constant potential source or not.

Should it be desired for any reason to impress upon the consumption circuit currents of only one direction from the alternating source, this might be accomplished by suppressing, for example, all the rectifiers in Fig. 1 except that shown at the top and numbered 5. The main 2 of the consumption circuit would then be connected directly with the wire 21 of the delivery circuit. Under these conditions, the positive impulses from one terminal of the source and negative impulses from the other terminal would traverse the circuit and supply it with current of uniform direction.

The present application is a division of applicant's case, Serial Number 155,923, filed May 6th, 1903, which is a division of application 140,353, filed Jan. 24, 1903.

I claim as my invention—

1. In a system of electrical distribution, the combination with an alternating supply, means for rendering the current from said supply of constant value and a plurality of alternating transformers connected in series in said constant current circuit, of means for supplying receiving circuits from said transformers, means for separately rectifying the current from the secondaries of said transformers for use in said individual receiving circuits whereby constant direct current is obtained therein and means for utilizing storage batteries for supplying current at constant potential to translating devices in one of said receiving circuits.

2. In a system of electrical distribution, the combination with an alternating supply, means for rendering the current from said supply of constant value and a plurality of alternating transformers connected in series in said constant current circuit, of means for supplying receiving circuits from said transformers, means for rectifying the current from the secondaries of said transformers for use in said individual receiving circuits, said last named means including mercury vapor rectifiers characterized by an exhausted container and a plurality of electrodes therein whereby constant direct current is obtained therein and means for utilizing storage batteries for supplying current at constant potential to translating devices in one of said receiving circuits.

Signed at New York, in the county of New York, and State of New York, this 10th day of June, A. D. 1910.

PERCY H. THOMAS.

Witnesses:
WM. H. CAPEL,
THOS. H. BROWN.